3,434,952
ELECTROCOATING BATH CONTROL
Ivan H. Tsou, Pontiac, Mich., assignor to Ford Motor Company, Dearborn, Mich., a corporation of Delaware
Filed Jan. 4, 1966, Ser. No. 518,670
Int. Cl. B01k 5/00; C23b 13/00
U.S. Cl. 204—181                 8 Claims This invention relates to the art of coating and specifically to improvements in painting an electrically conductive object by electrically induced deposition of a film-forming organic resin having free or dissociable carboxylic acid groups in its molecular structure, hereinafter referred to as a "polycarboxylic acid resin." In particular, this invention is concerned with a novel use of solvents in electrically induced codeposition of a polycarboxylic acid resin, pigmentation consisting of at least one component pigment, and water-soluble amino compound from an aqueous bath.

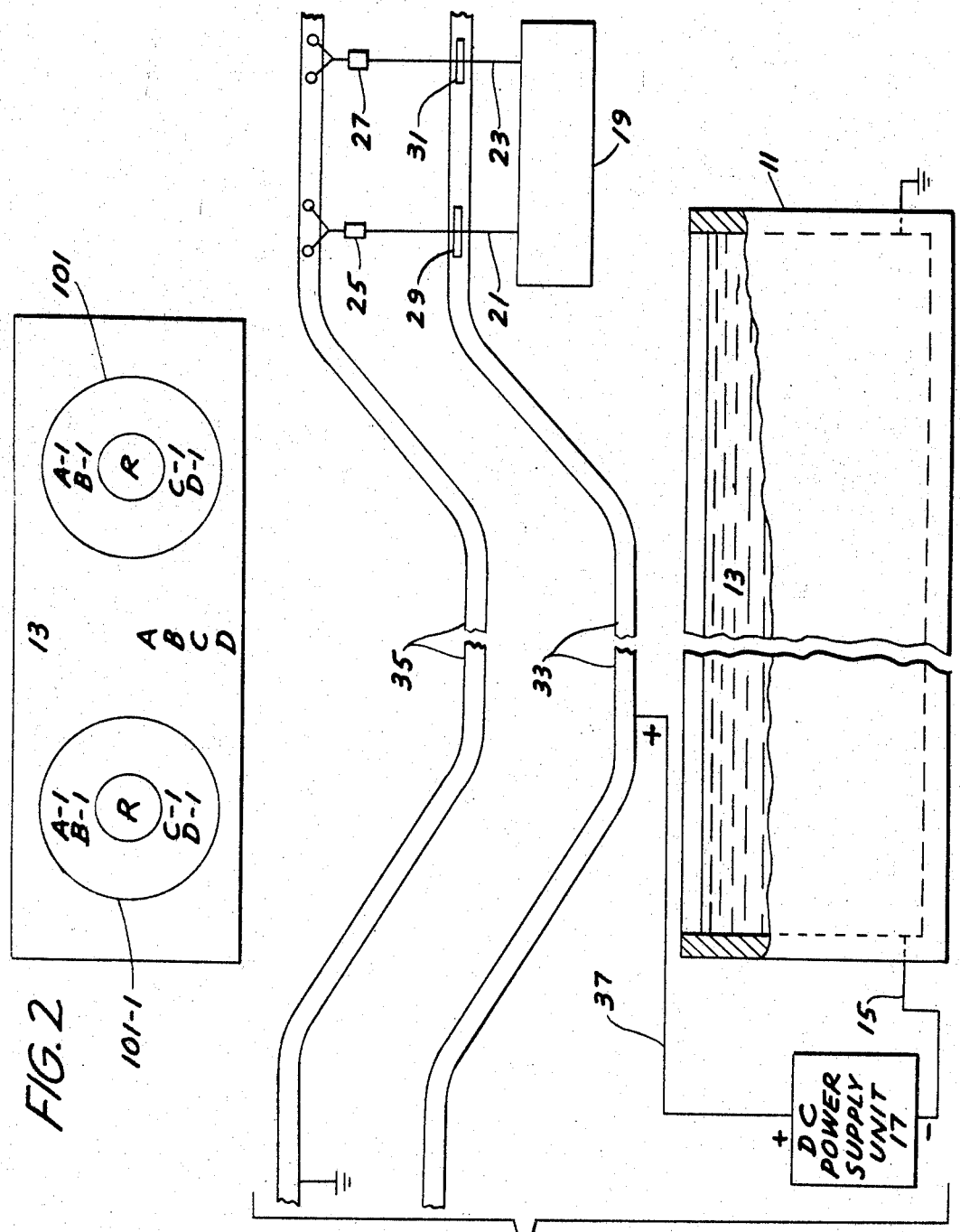

The organic film-forming binder resin employed in electrocoating as defined herein is of relatively high molecular weight, i.e. above about 500, and dispersal assistants are employed to effect stable, intimate dispersions of the binder resin within an aqueous bath. As hereinafter described in further detail, water-soluble amino compounds provide and/or assist in dissociation of free carboxyl groups on the resin molecules producing a plurality of ionic sites which in the coating process are attracted to the relatively positive workpiece electrode and assist in dispersion of the resin throughout the coating bath. Other dispersal assistants, hereinafter termed "solvents," also have been employed to initiate and maintain such dispersion.

The solvents heretofore employed have included lipophilic solvents, e.g. petroleum naphtha fractions, xylene, etc., and solvents having greater compatibility with water and which may be termed "mutual solvents" or "cosolvents," e.g. butoxy ethanol, methyl ethyl ketone, etc. The polycarboxylic acid binder resin is miscible with and/or soluble in both the hydrocarbon solvent and the cosolvent. All or substantially all, e.g. about about 75%, of the cosolvent is miscible with and/or soluble in the aqueous continuous phase of the coating bath.

With extension of time in bath, that portion of the cosolvent initially associated with the disperse phase tends to migrate into the continuous aqueous phase and that portion of the water-soluble amino compound component associated with the disperse phase tends to follow and/or migrate with the cosolvent. This provides a number of undesirable changes in the coating process. For example, less water-soluble amino compound is codeposited with the resin and/or pigment, thus resulting in amino build-up in the bath. Heretofore, control of amino concentration in the bath has been effected by separate amine removal via ion-exhange or electrodialysis techniques or by replenishing the bath with a high-solids or amino-starved replenishment feed. Loss of amino compound from or intimate association with the dispenser phase thereby reduces the throwing power of the paint with resultant loss of coverage in areas difficult to reach often necessitating compensatory voltage increase.

It now has been discovered that significant improvements can be obtained in electrocoating by controlled employment of a cosolvent for the aqueous and organic components of the coating bath which has limited solubility in water. In accordance with this invention, the cosolvent is employed in conjunction with a lipophilic solvent, e.g. a conventional hydrocarbon solvent which may be aliphatic, aromatic or mixed, and is soluble to a significant degree therein. The cosolvent is preferably one in which water is soluble to a greater degree than the cosolvent is soluble in water. The lipophilic solvent is employed in an amount sufficient to maintain the concentration in the aqueous phase at a predetermined level via extraction of the cosolvent into the disperse phase.

The electrocoating bath as employed herein contains an intimate dispersion of a film-forming polycarboxylic acid binder resin, water-soluble amino compound, water, a hydrocarbon solvent and a cosolvent for water and resin having a limited solubility in water. The bath may contain particulate pigment infusible at conventional paint baking temperatures and/or essentially nonionic particulate resin solids that fuse with the binder resin at said baking temperatures, e.g. by chemical crosslinking or physical blending wherein the particulate character of such solids is lost.

While at least a major fraction of the film-forming binder resin is a polycarboxylic acid resin, it will be understood that in accordance with techniques well known in the art the polycarboxylic acid resin may be blended and/or reacted with conventional resin extenders, plasticizers, etc., to suit the individual need. The concentration of such materials should be limited so as not to mask the electrical migration characteristics of the principal and essential acid binder resin.

The concentration of dispersed film-forming binder resin in the bath may range between about 1 and about 35 wet percent of the bath, preferably between about 5 and about 15 wt. percent.

Suitable cosolvents tested for use in this process include n-butoxy propanol, butyl lacetate and $C_5$–$C_6$ monohydric alcohols. It will be obvious from these teachings that other compounds having the solubility characteristics herein outlined can be substituted so long as they are compatible with the other components of the paint bath and do not adversely affect the properties of the electrodeposited paint film. Compounds consisting of carbon, hydrogen and oxygen and meeting the desired solubility characteristics are preferred.

The water-soluble amino compounds heretofore referred to include those now known to the art for use in electrocoating baths. These include hydroxy amines, polyamines and monoamines such as monoethanolamine, diethanolamine, triethanolamine, N-methyl ethanolamine, N-aminoethyl ethanolamine, N-methyl diethanolamine, monoisopropanolamine diisopropanolamine, triisopropanolamine, "polyglycol amines" such as $$HO(C_2H_4O)_2C_3H_6NH_2$$

hydroxylamine, butanolamine, hexanolamine, methyldiethanolamine, octanolamine, and alkylene oxide reaction products of mono- and polyamines such as the reaction propylene oxide, laurylamine with ethylene oxide, etc.; product of ethylene diamine with ethylene oxide or ethylene diamine, diethylene triamine, triethylene tetramine, hexamethylene tetramine, tetraethylene pentamine, propylene diamine, 1,3-diaminopropane, immo-bis-propyl amine, and the like; and mono-, di-, and tri- lower alkyl ($C_{1-8}$) amines such as mono-, di-, and triethyl amine. Although not preferred, ammonia can be substituted for at least a portion of the water-soluble amine component and is herein included within the term "amino compound."

The hydrocarbon solvent may be aliphatic, aromatic, or a mixture of aliphatic and aromatic compounds. It should have a flash point, Cleveland Open Cup, of above about 110° F. Medium boiling range petroleum naphtha distillates having components boiling in the range of about 200° F. to about 560° F. are suitable for this purpose. This solvent may also be a single compound type solvent such as xylene.

It will be understood by those skilled in the art that the concentration of cosolvent employed will vary somewhat with the cosolvent chosen taking into consideration its solubility in water, the solubility of water in the cosolvent, the solubility and/or miscibility of the cosolvent with the binder resin, and the requisites for emulsion formation, bath stability, bath conductivity, and effect on resultant film properties. Within the guidelines hereinbefore and hereinafter set forth the optimum concentration for a given cosolvent with a given polycarboxylic acid binder system can be determined by routine testing. In general the cosolvent should comprise about 0.5 to about 5, advantageously about 1.5 to about 3.5 wt. percent of the aqueous bath.

The hydrocarbon solvent will extract a portion of the cosolvent from the aqueous phase and hence is employed in an amount sufficient to maintain the concentration of the cosolvent in the aqueous continuous phase at within a predetermined range. The concentration of hydrocarbon solvent is maintained below that level at which film sag resulting from excess deposit of such solvent is initiated. Advantageously, the concentration of the hydrocarbon solvent in the coating bath will be held below about 2.5 wt. percent of the bath and preferably will be in the range of about 0.3 to about 1.9 wt. percent of the bath.

The concentration of water-soluble amino compound in the bath is sufficient to maintain the polycarboxylic acid resin as an intimately dispersed electrolyte in bath and to control the pH of the bath in accordance with the electrodeposition characteristics of the acid resin employed. The pH of the bath with various acid resin systems may vary in the range of about 5.8 to about 10.5 but is advantageously maintained closer to neutral, e.g. about 6.8 to about 8.4. The bath temperature is advantageously maintained in the range of about 15° C. to about 50° C.

Electrideposition of the polycarboxylic acid resin is carried out at a potential above the threshold voltage characteristic of the acid resin employed, i.e. the voltage at which electrodeposition of the dispersed resin is initiated upon an electrically conductive workpiece when a direct electric current is passed through the bath between the workpiece and a second electrode that is electrically negative in relation to the workpiece, spaced apart from the workpiece, and in electrical contact with the bath. The maximum tolerable voltage is slightly below the rupture voltage of the resin employed, i.e. that voltage at which a resin film already laid down by this method ruptures upon continued application of such voltage during the immersion of the workpiece in the bath for coating. With coating compositions now available and suitable for this purpose the coating voltage may be as low as about 20 volts but is advantageously between about 50 and about 500 volts, more commonly between about 100 and about 300 volts. The exemplary resins hereinafter set forth are characterized by exceptionally high throwing power and can be successfully deposited in the lower portion of the above range.

Other features and advantages will be apparent from the accompanying drawings, in which:

FIGURE 1 is a schematic drawing depicting one embodiment of apparatus suitable for use in carrying out the process of this invention;

FIGURE 2 is a schematic illustration of a small segment of the coating bath greatly enlarged and serves to illustrate division of bath components between disperse and continuous phases.

Figure 3:
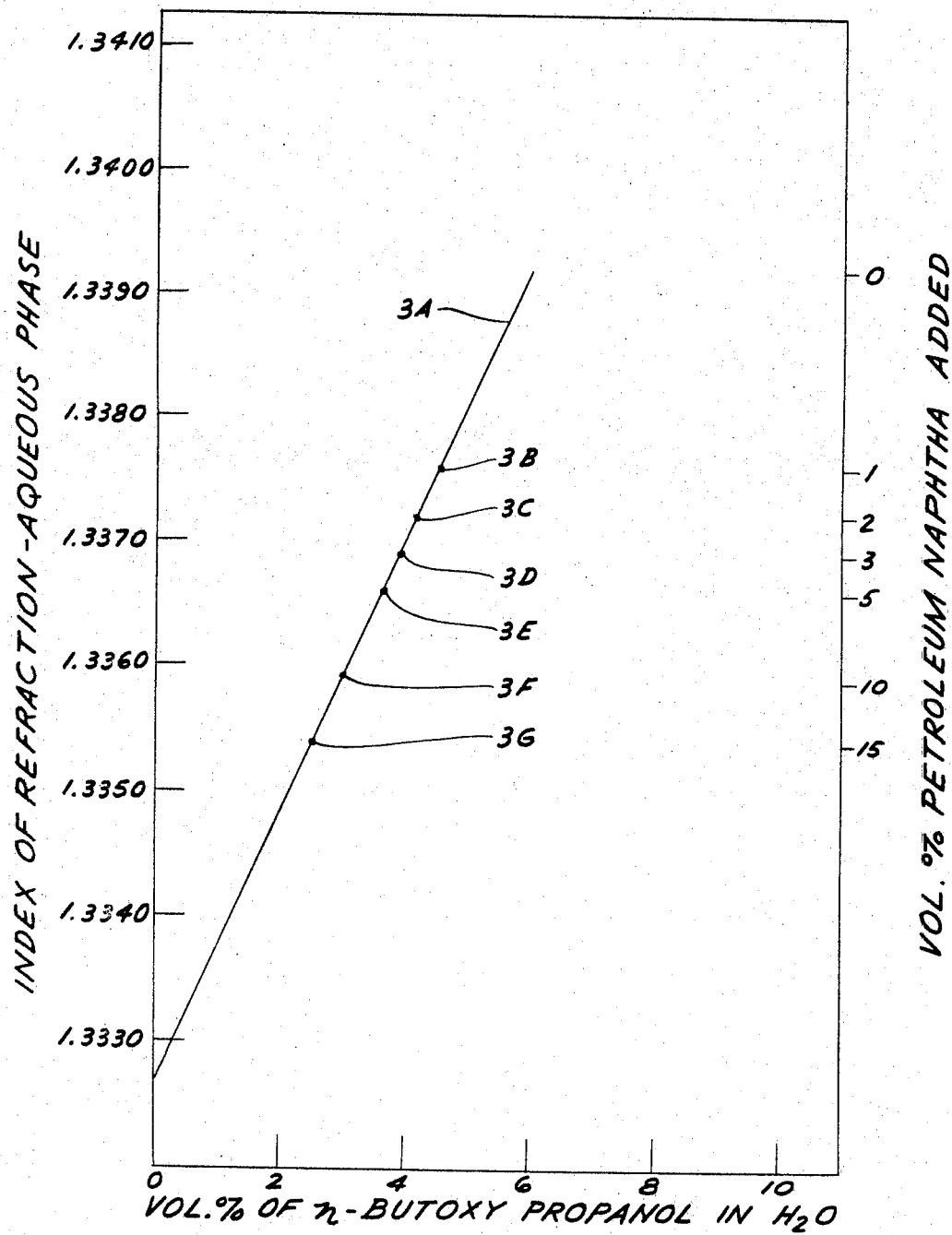
FIGURES 3 to 7 inclusive graphically illustrate the effect of a conventional hydrocarbon solvent upon the aqueous phase concentration of specific cosolvents.

Referring now to FIGURE 1, there is shown a steel tank 11 which contains an aqueous coating bath 13 and serves as a negative electrode in the coating process. Tank 11 is electrically connected to D.C. power supply unit 17 via conductor 15. An article to be coated 19, e.g. an automobile body or part thereof, is shown suspended from a conveyor 35 by hangers 21 and 23. The difference in electrical potential between tank 11 and article 19 is maintained in the range of about 20 to about 500, commonly between about 100 and 300, volts. The current density at the workpiece is maintained at about 0.5 to about 5, commonly about 1 to about 3.5 amperes per square foot to electrically induce deposit of the resinous coating material dispersed in bath 13.

Conveyor 35 is a conventional, electrically powered, chain driven conveyor constructed and arranged for the transportation of articles through bath 13 for coating. Hangers 21 and 23 includes insulators 25 and 27 respectively. Article 19 is shown approaching bath 13 and in electrical connection with bus bar 33 which in turn is in electrical connection with D.C. power supply unit 17 via conductor 37. Article 19, therefore, serves as the positive electrode of an electrodeposition cell while the article is passing through bath 13.

Power supply unit 17 is constructed and arranged to provide between the electrodes and through the coating bath a direct current flow of electrical energy that is commensurate with the size of the electrocoating operation contemplated. Ordinarily, such current will be provided by rectification of an alternating current power source by conventional means.

Referring now to FIGURE 2, there are schematically illustrated two greatly magnified and substantially identical disperse phase units 101 and 101–1 within a small portion of the aqueous coating bath 13. Within the continuous phase of the bath 13 there is present water identified by the letter A, water-soluble amino compound identified by the letter B, hydrocarbon solvent identified by the letter C and cosolvent identified by the letter D.

Each of the disperse phase units 101 and 101–1 comprises a polycarboxylic acid resin unit R, water designated A–1, water-soluble amino compound designated B–1, hydrocarbon solvent designated C–1 and cosolvent designated D–1. When the cosolvent D has limited solubility in water, e.g. less than about 10 parts in 100 parts water, preferably below about 7 parts in 100 parts water, and is predominantly or completely soluble in or miscible with the hydrocarbon solvent a portion of the cosolvent D of the continuous phase is held in the discontinuous phase units 101 and 101–1 by the hydrocarbon solvent C–1 in the disperse phase. Since the hydrocarbon solvent C has very low solubility in the continuous aqueous phase the concentration of hydrocarbon solvent C in the aqueous phase is insignificant in comparison with the concentration of hydrocarbon solvent C–1 in the disperse phase. Where the cosolvent is present in the bath in excess of its solubility in water the excess staying in emulsion will become a part of the disperse phase. Even when the concentration of cosolvent in the bath is below the saturation level for the continuous phase the presence of the hydrocarbon solvent will result in a reduction of the cosolvent concentration in the continuous phase and extraction of a portion of the cosolvent into the disperse phase. This is graphically illustrated in FIGURES 3 to 7 inclusive. As the concentration of cosolvent D–1 is increased in the disperse phase the concentration of water A–1 is increased in the disperse phase where water is significantly soluble in the cosolvent and the disperse phase will then retain a higher concentration of the water-soluble amine B–1. This increases the rate of amine removal with electrodeposition of the resin R as well as aiding in such deposition.

When cosolvent D is changed to a cosolvent that is largely or completely soluble in or miscible with the aqueous phase the concentration of D in relation to D–1 tends to increase with resultant decrease in A–1 and B–1 in the disperse phase.

The following examples further illustrate the instant invention.

EXAMPLE 1

The solubility and/or miscibility of the below listed cosolvents in deionized water and the solubility and/or miscibility of such water in the cosolvents were determined by mixing, layer separation and conventional Refractive Index measurement technique. The results obtained are set forth in the following table:

TABLE A

| Cosolvent | Percent cosolvent water layer | Percent water cosolvent layer |
|---|---|---|
| Methoxy ethyl acetate | (¹) | (¹) |
| Butoxy ethanol | (¹) | (¹) |
| n-Butoxy propanol | 6.4 | 15.5 |
| Butyl lactate | 4.0 | 14.5 |
| Methyl ethyl ketone | 26.8 | 11.8 |

¹ Complete miscibility.

Cosolvents were added to 95 parts deionized water-5 parts hydrocarbon solvent, hereinafter termed "Solvent A," systems and the diffusion ratios of cosolvent into the aqueous and hydrocarbon layers measured. The results obtained are set forth in the following table:

TABLE B

| Cosolvent | Parts cosolvent added | Parts cosolvent in H₂O layer | Parts cosolvent in solvent A¹ | Percent cosolvent diffused into H₂O layer |
|---|---|---|---|---|
| Methoxy ethyl acetate | 10 | 9.6 | 0.4 | 96 |
| Butoxy ethanol | 10 | 8.5 | 1.5 | 85 |
| Methyl ethyl ketone | 10 | 9.7 | 0.3 | 97 |
| n-Butoxy propanol | ²6 | 3.7 | 2.3 | 62 |
| Butyl lactate | ²4 | 2.6 | 1.4 | 65 |

¹ A petroleum naptha having the following properties: Wt./gal., lbs., 7.1; flash point, ° F., Cleveland open cup, 135; kauri butanol value, 74; distillation range, ° F., 346–410.
² Essentially equivalent to maximum number of parts soluble in water.

The degree to which various cosolvents are extracted from aqueous solutions of the same upon addition of varying amounts of hydrocarbon solvent, Solvent A hereinbefore described, is graphically illustrated in FIGURES 3 to 7 inclusive.

Referring now to FIGURE 3, Refractive Index measurements are made of deionized water before and after addition of various quantities of n-butoxy propanol up to a cosolvent concentration of 6 volume percent at which point the solution is essentially saturated. The Refractive Index readings for the two-component system are illustrated by the line designated 3A. With 6 volume percent cosolvent in the system, Solvent A is added in the amount of 1 volume percent and a Refractive Index reading is taken of the aqueous phase after agitation and layer separation. This reading is indicated at point 3B showing a marked decrease in cosolvent concentration in the aqueous phase. This procedure is repeated with separate additions of 2, 3, 5, 10 and 15 volume percent of Solvent A. The corresponding Refractive Index readings are designated 3B, 3C, 3D, 3E, 3F and 3G and indicate further decreases in the cosolvent concentration in the aqueous layer.

Figure 4:
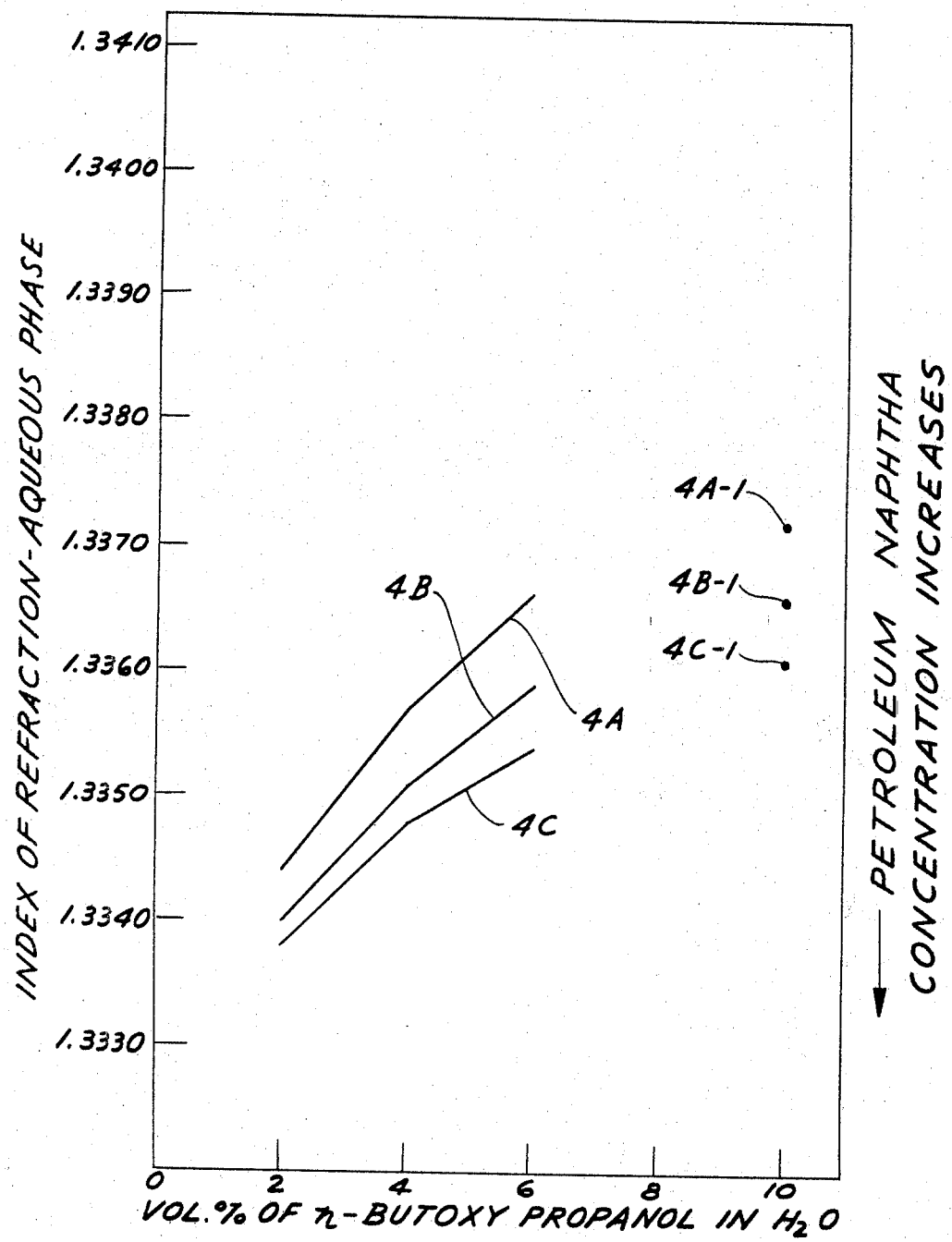

Referring now to FIGURE 4 the same water-cosolvent system is illustrated with 2, 4 and 6 volume percent of n-butoxy propanol tested in like manner with 5, 10 and 15 volume percent Solvent A. The Refractive Index readings of the aqueous layer with 5 volume percent Solvent A in the system are indicated by line 4A. The corresponding readings with 10 volume percent Solvent A employed are indicated by line 4B. The corresponding readings with 15 volume percent Solvent A employed are indicated by line 4C. The total concentration of cosolvent in the total system is increased to 10 volume percent and tested with 5, 10 and 15 volume percent Solvent A in the total system. The corresponding Refractive Index readings are indicated at 4A–1, 4B–1 and 4C–1. Thus, while the concentration of this cosolvent in the aqueous phase increases with an increase from 6 to 10 percent cosolvent in the total system, this concentration remains significantly below the saturation level in a two-component system of this cosolvent and water.

Figure 5:
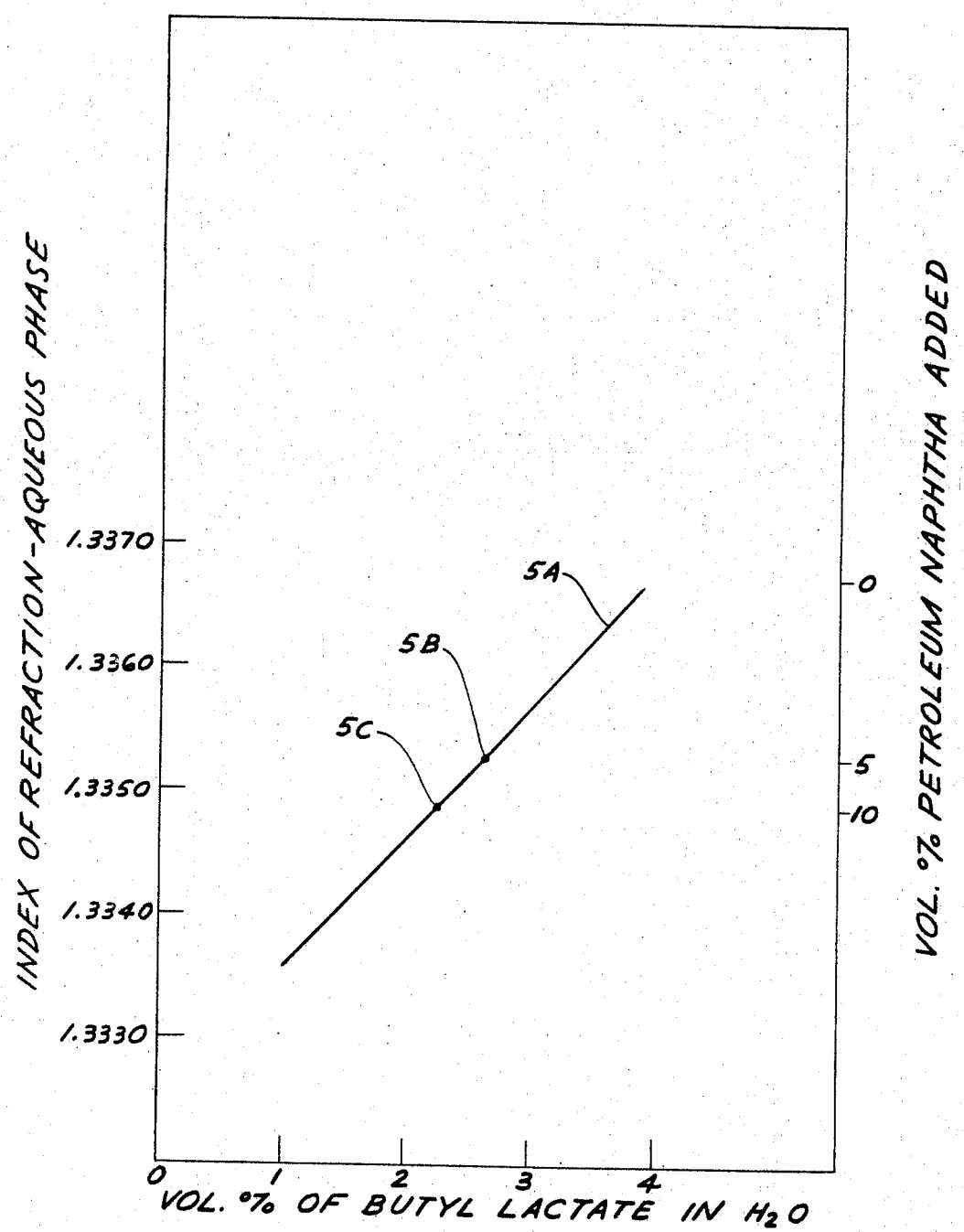

Referring now to FIGURE 5, the cosolvent employed is butyl lactate and line 5A designates the Refractive Index readings in cosolvent-water systems containing 1 to 4 volume percent cosolvent. To the two-component system is added 5 volume percent Solvent A and after agitation and layer separation the Refractive Index reading of the aqueous layer is indicated at 5B. The procedure is repeated with 10 volume percent Solvent A in the total system and the corresponding reading is indicated at 5C.

Figure 6:
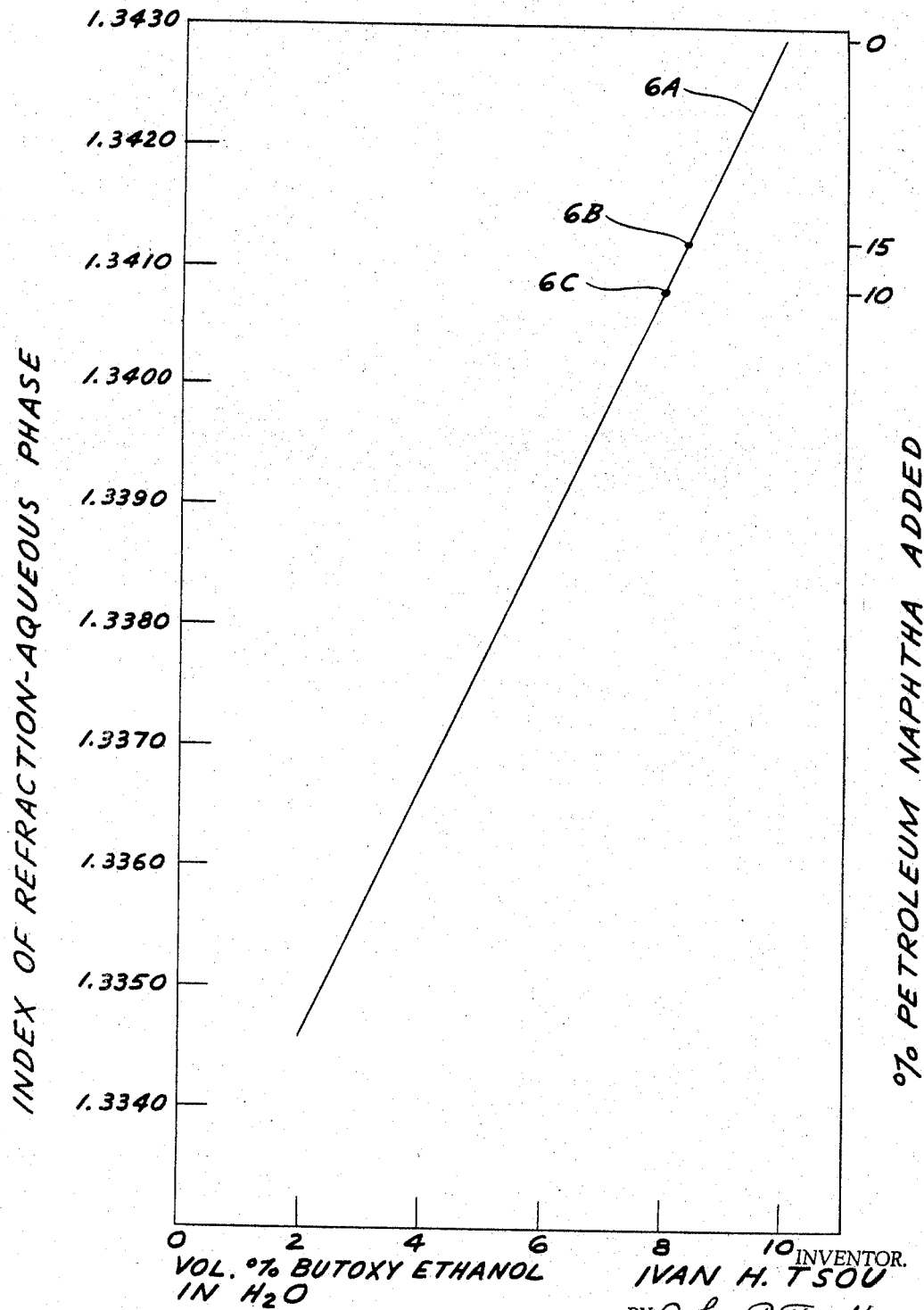

Referring now to FIGURE 6, the cosolvent employed is butoxy ethanol and line 6A designates the Refractive Index readings in cosolvent-water systems containing 2 to 10 volume percent cosolvent. To the two-component system is added 5 volume percent Solvent A and after agitation and layer separation the Refractive Index reading of the aqueous layer is indicated at 6B. The procedure is repeated with 10 volume percent Solvent A in the total system and the corresponding reading is indicated at 6C. It will be noted that even with 10 volume percent Solvent A in the system, the aqueous phase still contains about 8 volume percent of the cosolvent.

Figure 7:
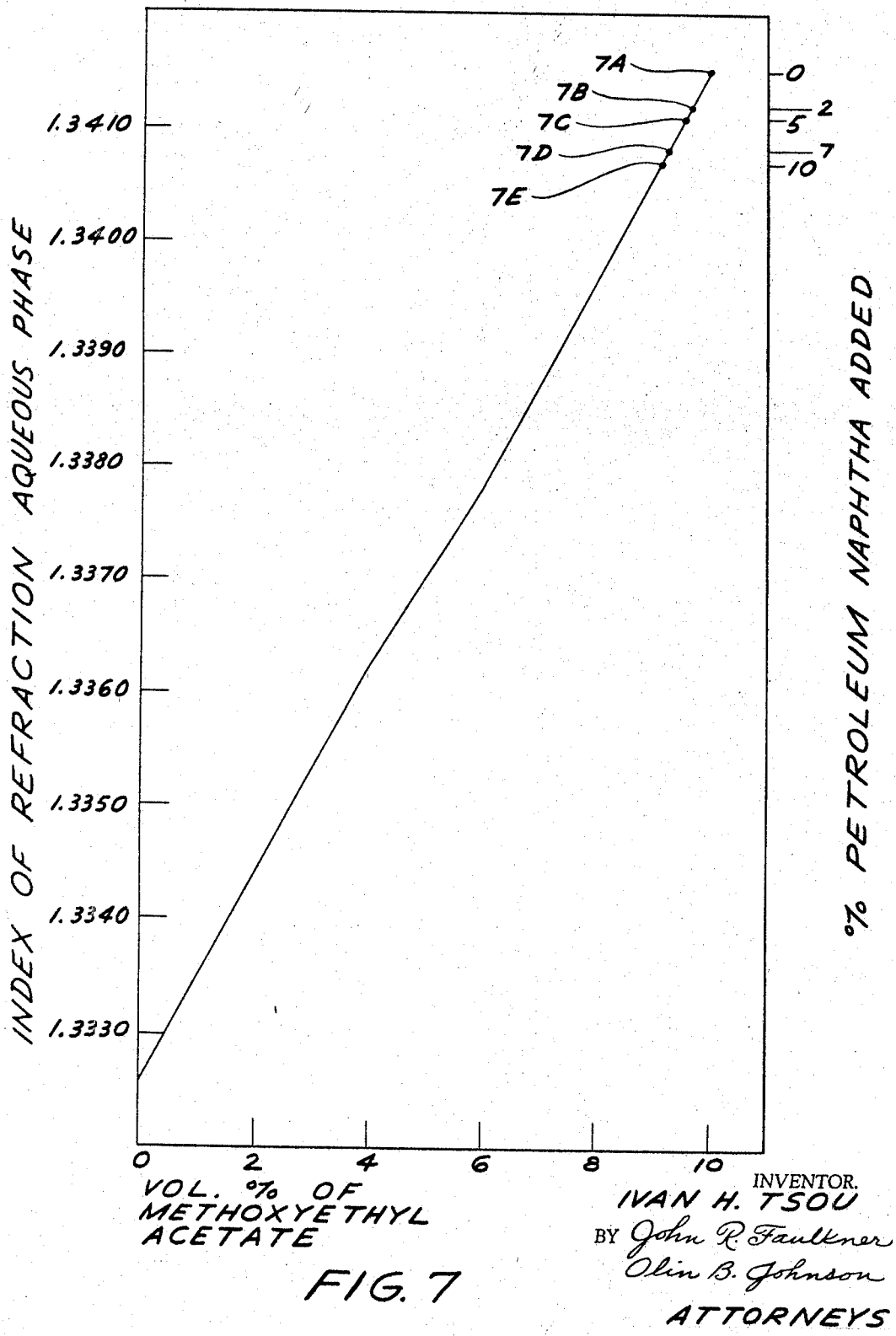

Referring now to FIGURE 7, the cosolvent employed is methoxy ethyl acetate and Refractive Index readings are indicated by line 7A in two-component cosolvent-water systems of 0 to 10 volume percent cosolvent. Solvent A is added in total system concentrations of 2, 5, 7 and 10 volume percent as in the preceding tests and the corresponding Refractive Index readings of the aqueous phase are indicated at 7B, 7C, 7D and 7E. It will be noted that with this cosolvent the addition of 10 volume percent Solvent A does not significantly reduce the concentration of cosolvent in the aqueous phase.

Additional tests were made using methyl ethyl ketone as the cosolvent and concentrations of 0 to 10 volume percent cosolvent employed. Addition of up to 10 volume percent Solvent A does not significantly decrease the cosolvent concentration in the aqueous phase.

EXAMPLE 2

An electrocoating bath was prepared in the following manner:

(1) Preparation of film-forming binder resin

To a resin kettle are charged 1893 pounds tall oil fatty acids. The charge is blanketed with nitrogen and heated to 150° F. To the charge is added 1 pound of sodium benzoate nad 1509 pounds of a conventional epichlorohydrinbisphenol A type epoxy resin (visc. cps. at 25° C., 7,000–9,000, specific gravity 1.16, epoxy assay grams/ gram mole oxirane oxygen 175–185). The charge is heated to 500° F. and this temperature is maintained until the resin has an acid number of less than about 0.2. The charge is then cooled to about 350° F. and 527 pounds trimellitic anhydride are added and this temperature is maintained until the resultant resin has an acid number of about 62. The total charge is 3930 pounds of which 123 pounds are removed via water loss and 107 pounds via kettle loss. The remaining 3700 pounds of resin, hereinafter termed "Resin A," are then added to a mixing tank containing 247 pounds Solvent A, (the hydrocarbon solvent heretofore described in Example 1) and 986 pounds n-butoxy propanol and mixed. The resultant resin-solvent mix is hereinafter termed "Resin-Solvent Mix A."

(2) Preparation of mill base

A mill base mix is prepared from the following materials:

| | Pounds |
|---|---|
| Resin-Solvent Mix A | 4068 |
| Carbon black | 315 |
| China clay | 315 |
| n-butoxy propanol | 170 |
| Solvent A | 42 |

This mix is ground in a peble mill for about 48 hours to a 6½ Hegman reading.

(3) Preparation of paint concentrate

To the grind prepared in (2) are added 4068 parts of Resin-Solvent Mix A and 0.78 part of a commercially available surfactant, a silicone liquid—(Dow Corning 200 Fluid). These materials are thoroughly mixed over a period of about 2 hours.

(4) Preparation of emulsion

An aqueous emulsion is prepared from the following materials:

|  | Pounds |
|---|---|
| Paint concentrate | 3073 |
| Triisopropanol amine | 447 |
| Deionized water | 5030 |

(5) Preparation of electrocoating bath

Deionized water is added to the emulsion prepared in (4) above until the solids content of the resultant emulsion is reduced to about 9%. Additional triisopropanol amine is added in an amount sufficient to adjust the pH of the bath to about 7.2 to about 7.4. The electrical resistance of this bath is about 284 ohm./cm.$^3$.

Test panels are electrocoated from this bath as hereinbefore described. At an impressed potential of about 50 volts a paint film measuring about 0.3 to about 0.5 mil is obtained. The maximum current flow achieved is about .00266 amp./cm.$^2$ or about 2.57 amps./ft.$^2$. These films are baked at conventional paint curing temperatures and times and provide a salt spray resistance in the range of about 72 to about 96 hours, conventional salt spray resistance test. At a potential of about 80–90 volts a paint film measuring about 0.8 is obtained. These films after baking are found to have a salt spray resistance in excess of about 120 hours.

An electrocoating bath is prepared as aforedescribed and employed in a continuous coating operation with periodic replenishment of the same composition as the original bath excepting water and amine. The replenishment feed is of the same composition as the bath except that water and amine are omitted and separately added to the bath. With the pH of the bath above about 7.0, preferably about 7.2 to about 7.6, this replenishment feed can be added directly to the bath without first being admixed with water and amine since a significant portion of the cosolvent remains intimately associated with the resins solids and hydrocarbon solvent throughout dispersion of the same. Triisopropanol amine is added periodically to maintain the pH in the desired range. At times amine addition is withheld until the pH drops to below 7.0 to substantiate that amine removal from this system occurs during electrodeposition at a rate at least substantially equal to the rate of paint solids removal. Water is added when necessary to maintain a bath of approximately the same solids concentration. The bath is operated for a total of 20 turnovers, i.e. until the bath solids have been expended and replaced 20 times. The composition of the bath is examined during each turnover and the results are set forth in the following table:

TABLE C

| No. of bath turnovers | Solids conc., wt. percent | pH | Milliequivalents triisopropanol-amine/100 grams paint solids | Bath resistance, ohm-cm. |
|---|---|---|---|---|
| 0 | 9.2 | 7.3 | 82 | 283 |
| 1 | 9.2 | 7.3 | 104 | 327 |
| 2 | 9.5 | 7.1 | 94 | 269 |
| 3 | 7.7 | 7.2 | 99 | 292 |
| 4 | 8.7 | 7.0 | 91 | 207 |
| 5 | 8.4 | 7.0 | 93 | 280 |
| 6 | 7.6 | 6.9 | 93 | 307 |
| 7 | 8.5 | 6.7 | 78 | 300 |
| 8 | 6.12 | 7.2 | 81.6 | 304 |
| 9 | 6.14 | 7.4 | 96.4 | 333 |
| 10 | 6.44 | 7.2 | 88.2 | 304 |
| 11 | 6.3 | 7.3 | 87.1 | 328 |
| 12 | 6.9 | 7.2 | 87.0 | 325 |
| 13 | 6.5 | 7.3 | 91.4 | 343 |
| 14 | 7.5 | 6.9 | 81.8 | 316 |
| 15 | 7.82 | 7.2 | 112 | 310 |
| 16 | 6.9 | 7.2 | 97.4 | 322 |
| 17 | 8.18 | 7.2 | 99.6 | 300 |
| 18 | 9.25 | 6.85 | 95.2 | 270 |
| 19 | 9.80 | 7.5 | 96.9 | 261 |
| 20 | 9.09 | 7.2 | 99.6 | 250 |

In another embodiment of the replenishment feed also contains intimately admixed therewith an amine concentration sufficient for maintenance of predetermined operational pH of the bath upon addition of the replenishment paint solids.

In another embodiment the replenishment feed also contains intimately admixed therewith an amine concentration insufficient to maintain operational pH of the bath upon addition of the replenishment paint solids and additional amine is separately and periodically added directly to the coating bath.

In another embodiment the replenishment feed contains in addition to pigment, binder resin, water-soluble amino compound, hydrocarbon solvent and oxygenated cosolvent, water in a concentration less than the operational concentration of water in the coating bath.

In another embodiment the replenishment feed is essentially the same as that of the coating bath.

In still another embodiment a polycarboxylic acid binder resin of the type exemplified in Example 1 of U.S. Patent 3,230,162, i.e. resinous reaction product of linseed oil and maleic anhydride modified by reaction with vinyl toluene and extended with phenol-formaldehyde resin, is employed and the weight ratio of binder resin to pigment in the bath is at least about 2:1 while the weight ratio of binder resin to pigment in the replenishment feed is at least about 1.5:1, less than that of the weight ratio of binder resin to pigment in the bath and substantially equal to the weight ratio of binder resin to pigment in the electro-deposited film.

EXAMPLE 3

The effect of different cosolvents upon the coating properties of an electrocoating bath and properties of an electrocoating bath and properties of the resultant film are determined under the conditions hereinafter set forth. Except for the changes in cosolvent and the changes hereinafter noted the bath is essentially the same as that described in Example 2. In the preparation of the initial resin corresponding to Resin A of Example 2, dehydrated castor oil fatty acids are employed to replace a portion of the tall oil fatty acids. Tests are carried out with the cosolvent added prior to emulsification with the water otherwise free of solvent A and the same addition made to water already saturated with the cosolvent B. The pH is maintained in the range of 7.0 to 7.5.

The solubility of the cosolvent in water, the solubility of water in the cosolvent, the maximum voltage obtained without film rupture for both A and B are set forth in the following table:

TABLE D

| Cosolvent | Solubility of cosolvent in $H_2O$, vol. percent | Solubility of water in cosolvent, vol. percent | Max. coating potential bath (A), volts | Max. coating potential bath (B), volts |
|---|---|---|---|---|
| Isohexanol | 0.41 | 5.5 | 50 | 50 |
| Methyl amyl alcohol | 1.7 | 5.8 | 80 | 40 |
| Amyl alcohol (mixed isomers) | 1.7 | 9.2 | 125 | 70 |
| 2-methyl, 1-butanol | 2.2 | 8.3 | 100 | 50 |
| Pentanol | 2.6 | 9.5 | 70 | 30 |
| Butyl lactate | 4.0 | 14.5 | 170 | 60 |
| n-Butoxy propanol | 6.4 | 15.5 | 120 | 30 |

It will be understood that the invention is not limited to the embodiments illustrated in the foregoing examples and that changes and modifications therein can be made without departing from the scope of the invention as defined in the appended claims.

What is claimed is:

1. In a coating process which comprises immersing an electrically conductive object in an aqueous coating bath having a first electrode spaced apart from said object and in electrical contact with said bath and a film-forming polycarboxylic acid resin comprising coating material dispersed in said bath in a manner such that said bath comprises a continuous aqueous phase and a resin comprising disperse phase, providing said first electrode with a negative electrical potential relative to said object thereby providing a direct current flow of electrical energy through said bath and between said first electrode and said object which electrically induces deposition of said coating material upon said object and forms a film of said coating material on said object, and withdrawing the resultant coated object from said bath, the improvement which comprises maintaining in said bath the combination of a first solvent that is miscible with said resin and has a solubility in water at about 25° C. not substantially in excess of about 10 wt. percent and a second solvent that is miscible with said resin, essentially insoluble in water, and in which said first solvent is significantly soluble, and maintaining the concentration of said second solvent in said bath at a level sufficient to maintain the concentration of said first solvent in said aqueous continuous phase below a predetermined level.

2. The process of claim 1 wherein said first solvent has a lower solubility in water than the solubility of water in said first solvent.

3. The process of claim 1 wherein said second solvent comprises less than about 2.5 wt. percent of said coating bath and has a solubility in water of less than about 1 percent.

4. The process of claim 1 wherein the weight ratio of the combination of said resin and said pigment to the combination of said first solvent and said second solvent in said bath is in the range of about 2.5:1 to about 3.5:1.

5. The process of claim 1 wherein the weight ratio of said first solvent to said second solvent in said bath is in the range of about 3.5:1 to about 4.5:1.

6. The process of claim 1 wherein said coating bath comprises a fluent mixture of water, film-forming resin binder at least the major fraction of which is polycarboxlyic acid resin, particulate mineral pigment, water-soluble amino compound in an amount sufficient to maintain said polycarboxylic acid resin as a dispersion of anionic electrolyte in said aqueous bath, said first solvent and said second solvent.

7. The process of claim 6 wherein said water-soluble amino compound is electrodeposited from said bath with said binder resin at a rate not substantially less than the rate at which said binder resin is electrodeposited.

8. The process of claim 6 wherein said coating material is replenished by adding to said bath a paint concentrate comprising said binder resin, said mineral pigment, said first solvent and said second solvent, the weight ratio of the combination of said resin binder and said mineral pigment to the combination of said solvents being in the range of about 2.8:1 to 3.2:1 and the weight ratio of said first solvent to said second solvent being in the range of about 3.8:1 to about 4.2:1.

References Cited

UNITED STATES PATENTS

| | | | |
|---|---|---|---|
| 3,230,162 | 1/1966 | Gilchrist | 204—181 |
| 3,335,103 | 8/1967 | Huggard | 204—181 |
| 3,340,172 | 9/1967 | Huggard | 204—181 |
| 3,364,162 | 1/1968 | Huggard | 204—181 |

JOHN H. MACK, *Primary Examiner.*

E. ZAGARELLA, *Assistant Examiner.*